United States Patent [19]

Cornett et al.

[11] Patent Number: 4,972,486
[45] Date of Patent: Nov. 20, 1990

[54] METHOD AND APPARATUS FOR AUTOMATIC CUING

[75] Inventors: R. Orin Cornett, Laurel, Md.; Robert L. Beadles, Durham, N.C.

[73] Assignee: Research Triangle Institute, Research Triangle Park, N.C.

[21] Appl. No.: 352,657

[22] Filed: May 12, 1989

Related U.S. Application Data

[63] Continuation of Ser. No. 715,756, Mar. 25, 1985, abandoned, which is a continuation of Ser. No. 198,211, Oct. 17, 1980, abandoned.

[51] Int. Cl.$^5$ ............................................... G10L 5/00
[52] U.S. Cl. ..................................................... 381/48
[58] Field of Search .......................................... 381/48

[56] References Cited

U.S. PATENT DOCUMENTS

| | | | |
|---|---|---|---|
| 3,463,885 | 8/1969 | Upton | 381/48 |
| 3,936,605 | 2/1976 | Upton | 381/48 |
| 4,015,087 | 3/1977 | Stewart | 381/48 |

OTHER PUBLICATIONS

Flanagan, "Speech Analysis, Synthesis and Perception", Springer, Verlag, 1972, pp. 139, 140.

Primary Examiner—Emanuel S. Kemeny
Attorney, Agent, or Firm—Cushman, Darby & Cushman

[57] ABSTRACT

For hard of hearing people, speech sounds are recognized electronically and displayed on eyeglasses at syllable speed, consonants are shown as a symbol resembling a hand sign, and vowels by the symbol's location in a quadrant display, or by color.

15 Claims, 3 Drawing Sheets

METHOD AND APPARATUS FOR AUTOMATIC CUING

This is a continuation of application Ser. No. 06/715,756, filed Mar. 25, 1985, which is a continuation of application Ser. No. 06/198,211, filed Oct. 17, 1980, both abandoned.

BACKGROUND AND SUMMARY OF THE INVENTION

The present invention relates to a method and apparatus for producing an image of speech information, particularly a symbol indicating one of a plurality of groups of detected sounds, and projecting that image in a mode indicating a sequence of syllable into the field of view of a hearing impaired wearer of the device.

Innumerable situations exist in which it is desirable to supply information to an individual by superimposing an image onto his normal field of vision. One example such a display is needed is for the projection of symbols indicating one of a plurality of detected groups of sounds onto the field of vision of a deaf or heating impaired person.

Communication in any spoken language is made up of sequences of sounds which are called phonemes. By observation of the movements of the lips of a speaking person, a hearing impaired or deaf person can discern that each sound is one of a limited number of possible phonemes. Unfortunately, however, the ambiguities for a totally deaf person are too great for effective communication to take place using only lipreading.

If a person has some aid in resolving ambiguities, for example, understanding of an additional 10-20% of phonemes in addition to those understood by lipreading alone, then enough of the information in the speech can be understood by a trained lipreader for effective transfer of information. Often a lipreader will have limited hearing sufficient for this purpose. Alternatively, manual cuing, a technique developed by Orin Cornett of Gallaudet College, and one of the co-inventors of the present application, utilizes hand cues to remove sufficient ambiguities to make lipreading practical. The difficulty with manually cued speech, of course, is that it can be used only with those individuals who have been trained to use it, thus limiting severely the number of people whom a deaf person can understand.

The different sounds of any language have different waveform characteristics which permit limited differentiation into different groups of sounds. These basic analyzing techniques are old and are described, for example, in pages 139-158, J. L. Flanagan, *Speech Analysis, Synthesis and Perception,* Academic Press, 1965. Using these analytic techniques, signals can be produced from detected spoken sounds, each signal indicating one of a plurality of different sound groups. The sounds in each group are differentiable on the lips so that, if this information can be effectively communicated to the lipreader, sufficient ambiguities can be removed to permit effective lipreading.

One way to communicate sufficient information to a lipreader to make lipreading truly effective is to superimpose a symbol identifying a sound group upon the viewer's field of vision which he can see as he watches a speaker's lips. This basic technique is described in two patents to Upton U.S. Pat. Nos. 3,463,885 and 3,936,605. In both of these patents a display disclosed which is mounted upon a pair of spectacles intended to be worn by the hearing impaired or deaf person. In the system described in Upton U.S. Pat. No. 3,463,885, three types of sounds are detected—fricative, plosive and voiced. A number of bulbs are mounted on a lens of the spectacles, and each associated with one of these types of sounds. The associated bulb is activated when that type of sound is detected. In one embodiment, sounds which are a combination of these different types of sounds activate more than one bulb. In another embodiment, separate bulbs are utilized to denote combinations.

One of the difficulties with the system of Upton is that each of its indications is that of a single phoneme, and, at normal rates of speaking, the sounds occur so quickly that it is doubtful that they can be effectively used at that rate by the brain. According to the present invention, this problem is reduced by displaying information as syllables, i.e., normally a combination of a consonant sound and a vowel sound, although occasionally a single phoneme can be a syllable. One way that syllable information can be display is with a symbol indicating one of a plurality of consonant groups in a mode indicating an associated vowel group. For example, a symbol indicating one of nine consonant groups can be projected to one of four spatial locations. i.e., quadrants, the spatial location indicating the associated vowel group. Another approach is to project the symbol in one of a number of colors, for example, four, each color indicating an associated vowel group.

As such, the present invention has the object of automating manually cued speech.

Other objects and purposes of the invention will be clear from the following detailed description of the drawings.

BRIEF DESCRIPTION OF THE DRAWINGS

FIG. 3 shows a diagram of the consonant and vowel groups;

DETAILED DESCRIPTION OF THE DRAWINGS

Figure 1:
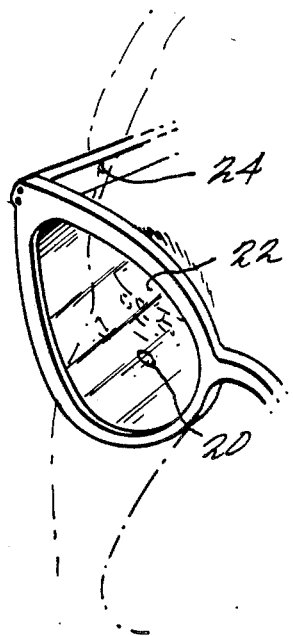
FIG. 1 shows a perspective view of the device of the present invention mounted on an eyeglass frame.
Figure 2:
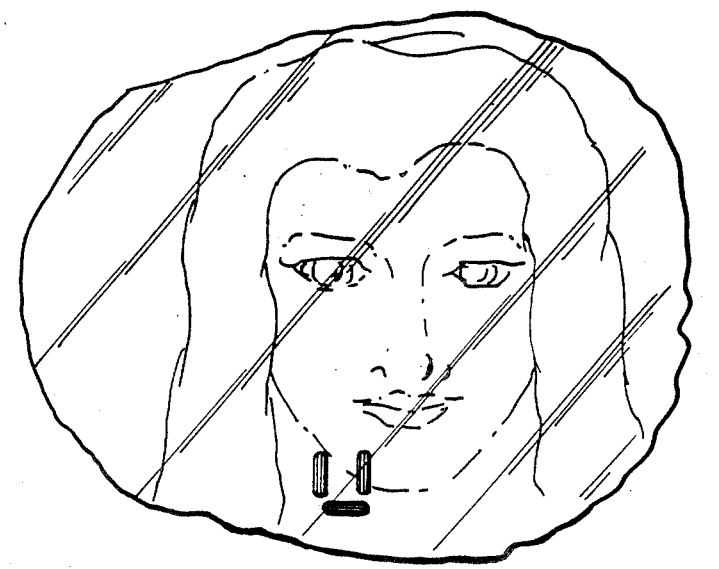
FIG. 2 shows a view of one of the symbols of the present invention superimposed upon an image in the field of view.
Figure 3:
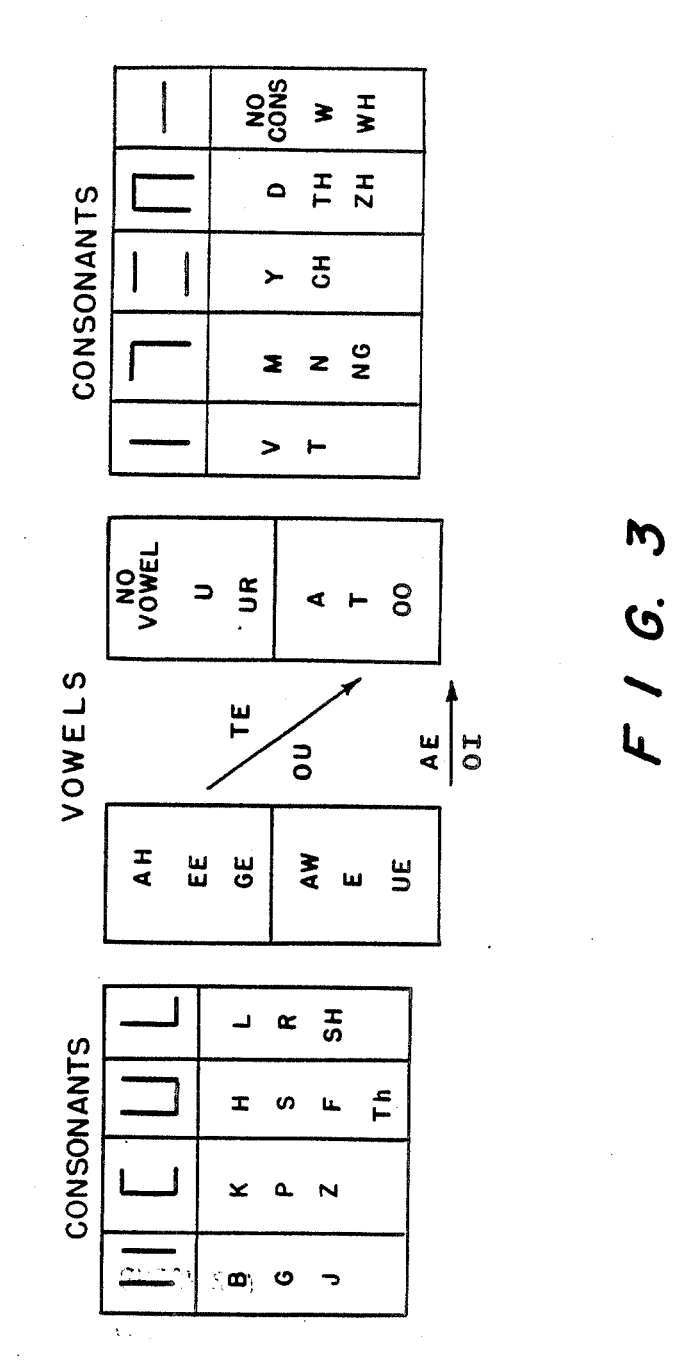

Reference is now made to FIGS. 1 and 2 which show a schematic view of the display 20 of the present invention mounted on a conventional prescription lens 22 which is in turn mounted within a conventional eyeglass frame 24 and producing a symbol superimposed on the field of view. As discussed in detail below, display 20 produces an image of one of a number of different symbols, each symbol being associated with one of a number of groups of consonants as shown in FIG. 3, and projected in a mode identifying a group to which an associated vowel is assigned. For example, each symbol can be projected to one of four quadrants, each quadrant being associated with a different group of vowels, the combination of the consonant symbol and its location defining a syllable. Alternatively, the color of the symbol can indicate the vowel group by activating one or more displays of different colors or controlling a conventional multi-color display.

Techniques for producing and projecting single color symbols are described in the above-mentioned patent application and book and in detail in the reports entitled "A Feasibility Study for the Development of a Speech Autocuer" (NASA Contract Number NAS5-2554).

FIG. 3 illustrates one possible set of groupings of consonants and vowels and the associated consonant symbols and vowel locations or other modes of presentation. With the exception of the group of consonants containing "n" and "ng", the consonants of each group can be readily differentiated by a lipreader from each of the other consonants of that group from observation of the speaker's mouth alone. The single exception causes minimal linguistic confusion in English because discrimination between "n" and "ng" is rarely required for understanding. Some syllables have no vowels and rapidly spoken syllables often have a vowel which may not be detected. The detected absence of a vowel is treated as a component of one vowel group. Absence of a consonant is treated similarly. Diphthongs are handled by movement of the symbol from one quadrant position to another, based upon the vowel components of the diphthong as schematically shown in FIG. 3.

Display 20 may be any conventional display which can project a symbol identifying a consonant in a mode identifying a vowel or vice versa. One suitable display is made up of two light emitting or illuminated arrays, and structure defining a beamsplitter associated with each of the respective arrays. The beamsplitter is formed by a coating of silver, aluminum or the like coated onto the interior surface of a conventional prescription lens of glass or suitable plastic. The arrays are mounted upon a transparent substrate by any suitable means, and the substrate in turn fixed at its extremities to the prescription lens by any suitable means.

The lens is first ground to the required outer radius to provide the desired prescription, if any. Next spherical dimples are ground on the inner surface of the lens to a radius suitable to provide the desired magnification. The interior surface of the lens is next optically coated with a coating, for example, by deposition in a vacuum. The dimples are then back filled with material having the same, or virtually the same index of refraction as the material of the lens. The material filling the dimples may be the same material as the lens.

Alternatively, the interior surface of the lens is curved at a short enough radius to project suitably magnified symbol image without dimples.

Either the top portion or the lower portion of one display is actuated to cause production of symbol with associated mirror then projecting that symbol to one of four quadrants. In other words, each display projects to an upper or lower spatial location depending on whether the upper or lower portion is activated.

As described above, a symbol indicating a group of consonants, for example, as shown in FIG. 3, is projected to a quadrant indicating the group to which an associated vowel belongs. Alternatively, the color of the symbol can indicate the vowel group.

Figure 4:
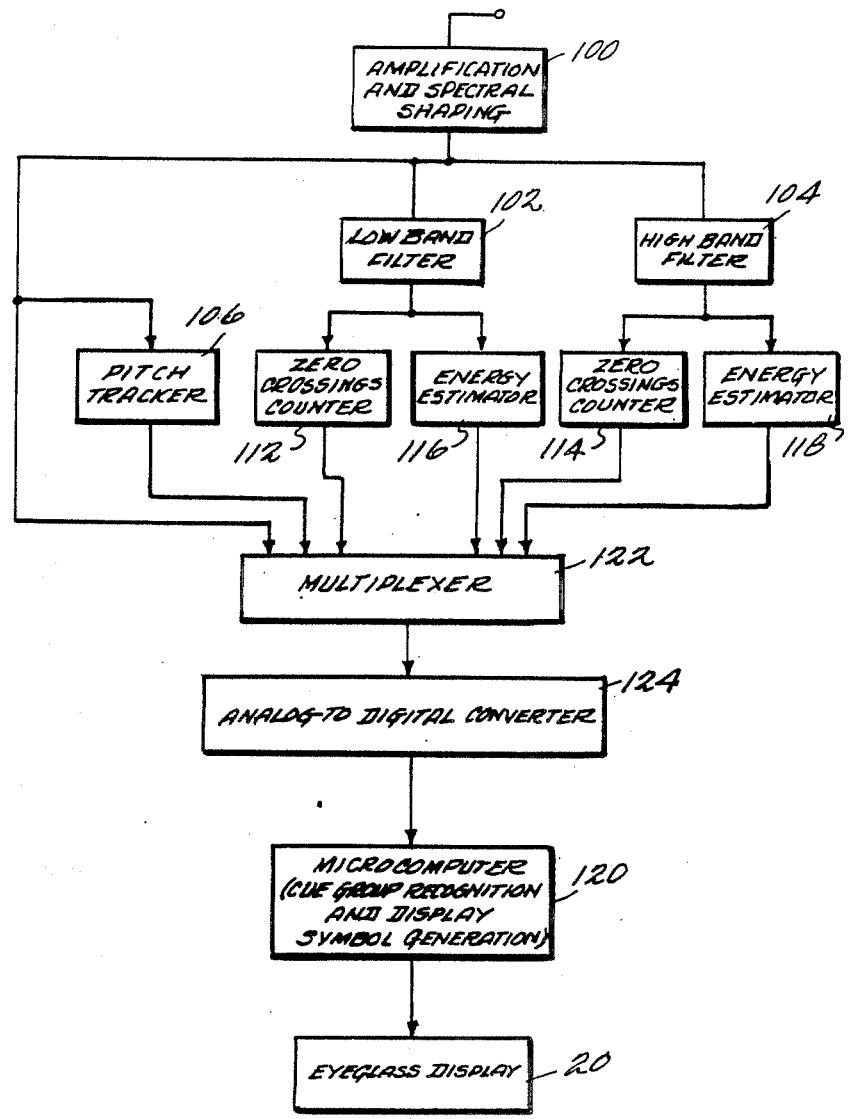
FIG. 4 shows a block diagram of the circuit which produces signals indicating the consonant and vowel groups.

Reference is now made to FIG. 4 which shows in block diagram an analyzing circuit for producing signals to cause display of detected syllables. The detected sound signals are first amplified and shaped by a conventional circuit 100 and applied to conventional low-pass and high-pass filters 102 and 104. The outputs of filters 102 and 104 are in turn applied to zero crossing counters 112 and 114, respectively, and energy estimating circuits 116 and 118, respectively.

The energy estimating circuits average, that is, integrate the energy content of the electrical signal on short intervals, for example, 10 milliseconds, in both high and low frequency bands. Microcomputer 120 which receives signals via multiplexer 122 and analog-to-digital converter 124 first looks for peaks, valleys and major slope changes in the energy estimated signals for the high frequency band. Significant peaks are "marked" as potential phoneme "centers". Significant valleys or major slope changes are marked as phoneme "boundaries", that is, the beginning and end of a potential phoneme. The centers are used for spectral analysis as described in the book by Flanagan set forth above. This primary segmentation finds approximately 70% of the phonemes.

Secondary segmentation is then used to check the phonemes found by primary segmentation and to find additional phonemes. In secondary segmentation, the duration, energy, voice pitch, spectral content and energy ratio between low and high frequency regions are examined to attempt to pick up phonemes not detected during primary segmentation. After the secondary determination, there are no indeterminate regions left and all of the information can be examined to decide whether each phoneme is a vowel or consonant.

The low frequency energy estimator circuit 116 is utilized to produce independent markers to determine if the high frequency marked region is a consonant or a vowel. The regions between boundaries of the high frequency markers are examined to detect silent intervals preceding bursts of stop sounds, nasal sounds or liquid, i.e., semi-vowel sounds.

The vowel, non-vowel decision is made by computing the linear prediction co-efficients at energy peaks, i.e., locations of "center" marks. Techniques for performs linear prediction are discussed in further detail in R. W. Schafer, *Digital Signal Processing and Speech Analysis and synthesis,* Proceedings of the IEEE Fall Electronics Conference, Chicago, Ill., Oct. 1971, pp. 29–30.

If computer 120 decides that a given sound is a consonant, then the cue group code for that consonant is stored and the next sound is classified. As soon as a vowel is identified, a signal is produced indicating where the preceding consonant signal is to be projected, that is, into which quadrant. If the following sound is not a vowel, the consonant is displayed for the duration of the consonant. If the first sound is a vowel, the "no consonant" symbol is displayed. The circuitry is reset after each pause.

Not infrequently, two centers will be marked between a pair of boundaries. This may indicate a diphthong. High frequency and low frequency spectral estimates are then inspected to determine if they are characteristic of the first vowel in a diphthong. If so, the second peak is examined to determine if it has the minimum distance from the first peak, and its spectral energy is consistent with most prevalent diphthong second vowels.

The delays in the system are roughly one syllable, that is, 200 milliseconds, so that each syllable is normally displayed while the succeeding syllable is being spoken. At least some syllables will not be detected or displayed.

As described above, the basic techniques for detecting and classifying the individual phonemes are well known in the art and in the literature described above. Any suitable microprocessor can be utilized for performing the necessary calculations and logical decisions.

Many changes and modifications in the above-described embodiment of the invention can, of course, be made without departing from the scope of that invention. Accordingly, the scope is intended to be limited only by the appended claims.

What is claimed is:

1. An apparatus for providing a speech cuing symbol in the field of vision of a person comprising:

means for detecting a sequence of speech sounds of a speaker, and for producing an electrical speech signal for each said detected sound;

circuit means for receiving said speech signals and for determining from said speech signals whether each of said received speech sounds is a consonant sound or a vowel sound and for producing a speech cuing symbol signals when sequentially received speech signals define a consonant sound and a vowel sound, respectively, and which together form a syllable, each speech cuing symbol signal representing one of a plurality of groups of consonant sounds, the sounds in each of the groups of consonants sounds being differentiable one from the other by viewing the lips of the speaker, and one of a plurality of groups of vowel sounds the sounds in each of the groups of vowel sounds being differentiable one from the other by viewing the lips of the speaker, said groups of consonant sounds substantially corresponding to groups of consonant sounds used in manually cued speech, said groups of vowel sounds substantially corresponding to groups of vowel sounds used in manually cued speech; and means for displaying a speech cuing symbols for each said speech cuing symbol signal into the field of vision of a person, the speech cuing symbol displayed identifying the group of consonant sounds to which said syllable belongs and the speech cuing symbol being displayed in a location identifying the group of vowel sound to which said syllable belongs.

2. An apparatus as in claim 1, wherein said circuit means includes means for producing, in response to detection of a consonant sound, a first signal indicating one of said plurality of consonant sound groups, the detected consonant sound being consonant sound in that group and, in response to detection of a vowel, a second signal indicating one of said plurality of vowel sound groups, the detected vowel sound being a vowel sound in that group, and means for producing said speech cuing symbol signal when said first signal in combination with said second signal represent a syllable.

3. An apparatus as in claim 1, wherein said location is one or four quadrants corresponding to the four quadrants of the face used in manually cued speech.

4. A wearable apparatus for projecting images of cuing symbols into the field of vision of a hearing impaired or deaf person to aid in resolving ambiguities in lip reading of another person in said field of view comprising:

a spectacle frame to be worn by said hearing impaired or deaf person having at least one lens in said frame;

means operatively coupled to said frame for detecting speech sounds generated by said other person and for producing a series of signals representative of said speech;

circuit means for receiving said speech signals and for determining from said speech signals whether each of said received speech sounds is a consonant sound or a vowel sound and for producing a speech cuing symbol signal when sequentially received speech signals define a consonant sound and a vowel sound, respectively, and which together form a syllable, each speech cuing symbol signal representing one of a plurality of groups of consonant sounds, the sounds in each of the groups of constants sounds being differentiatable one from the other by viewing the lips of the speaker and one of a plurality of groups of vowel sounds the sounds in each of the groups of vowel sounds being differentiatable one from the other by viewing the lips of the speaker, said groups of consonant sounds substantially corresponding to groups of consonant sounds used in manually cued speech, said groups of vowel sounds substantially corresponding to groups of vowel sounds used in manually cued speech means for producing an image of one of a plurality of cuing symbols in response to said speech cuing symbol signal, said cuing symbol identifying the group of consonant sounds to which said syllable belongs; and means for displaying said image of said cuing symbol in said field of view in a location identifying the group of vowel sounds to which said syllable belongs.

5. An apparatus as in claim 4, wherein said circuit means includes means for producing, in response to detection of a consonant sound, a first signal indicating one of said plurality of consonant sound groups, the detected consonant sound being a consonant sound in that group and, in response to detection of a vowel, a second signal indicating one of said plurality of vowel sound groups, the detected vowel sound being a vowel sound in that group, and means for producing said speech cuing symbol signal when said first signal in combination with said second signal represent a syllable.

6. An apparatus as in claim 4, wherein said location is one of four quadrants corresponding to the four quadrants of the face used in manually cued speech.

7. An apparatus as in claim 8, wherein said step of displaying comprising displaying said each cuing symbol in one of four quadrants corresponding to the four quadrants used in manually cued speech.

8. A method of providing cues to a hearing impaired or deaf person to aid in resolving ambiguities from lip reading another person comprising the steps of:

detecting a sequence of speech sounds of a speaker, and producing an electrical speech signal for each said detected sound;

determining from said speech signals whether each of said speech sounds is a consonant sound or a vowel sound and producing a speech using cuing symbol signal when sequentially received speech signals define a consonant sound and a vowel sound, respectively, and which together form a syllable, each speech cuing symbol signal representing one of a plurality of groups of consonant sounds, the sounds in each of the groups of consonants sounds being differentiatable one from the other by viewing the lips of the speaker, and one of a plurality of groups of vowel sounds the sounds in each of the groups of vowel sounds being differentiatable one from the other by viewing the lips of the speaker, said groups of consonant sounds substantially corresponding to groups of consonant sounds used in manually cued speech, said groups of vowel sounds substantially corresponding to groups of vowel sounds used in manually cued speech; and displaying a speech cuing symbol for each said speech cuing symbol signal into the field of vision of a person, the speech cuing symbol displayed identifying the group of consonant sounds to which said syllable belongs and the speech cuing symbol being displayed in a location identifying the group of vowel sounds to which said syllable belongs.

9. A method as in claim 8, wherein said step of producing a speech symbol signal includes producing, in response to detection of a consonant sound, a first signal indicating one of said plurality of consonant sound groups, the detected consonant sound being a consonant sound in that group, and, in response to detection for a vowel, a second signal indicating one of said plurality of vowel sound groups, the detected vowel sound being a bowel sound in that group and producing a speech symbol signal when said first signal in combination with said second signal represent a consonant.

10. An apparatus for providing a speech cuing symbol in the field of vision of a person comprising:

means for detecting a sequence of speech sounds of a speaker, and for producing an electrical speech signal for each said detected sound;

circuit means for receiving said speech signals and for determining from said speech signals whether each of said received speech sounds is a consonant sound or a vowel sound and for producing a speech cuing symbol signal when sequentially received speech signals define a consonant sound and a vowel sound, respectively, and which together form a syllable, each speech cuing symbol signal representing one of a plurality of groups of consonant sounds, the sounds in each of the groups of consonants sounds being differentiatable one from the other by viewing the lips of the speaker, and one of a plurality of groups of vowel sounds the sounds in each of the groups of vowel sounds being differentiatable one from the other by viewing the lips of the speaker, said groups of consonant sounds substantially corresponding to groups of consonant sounds in manually cued speech, said groups of vowel sounds substantially corresponding to groups of vowel sounds used in manually cued speech; and means for displaying a speech cuing symbol for each said speech cuing symbol signal into the field of vision of a person, the speech cuing symbol displayed identifying the group of consonant sounds to which said syllable belongs and the speech cuing symbol being displayed in a color identifying the group of vowel sounds to which said syllable belongs.

11. An apparatus as in claim 10, wherein said circuit means includes means for producing, in response to detection of a consonant sound, a first signal indicating one of said plurality of consonant sound groups, the detected consonant sound being a consonant sound in that group and, in response to detection of a vowel, a second signal indicating one of said plurality of vowel sound groups, the detected vowel sound being a vowel sound in that group, and means for producing said speech cuing symbol signal when said first signal in combination with said second signal represent a syllable.

12. A wearable apparatus for projecting images of cuing symbols into the field of vision of a hearing impaired or deaf person to aid in resolving ambiguities in lip reading of another person in said field of view comprising:

a spectacle frame to be worn by said hearing impaired or deaf person having at least one lens in said frame;

means operatively coupled to said frame for detecting speech sounds generated by said other person and for producing a series of signals representative of said speech;

circuit means for receiving said speech signals and for determining from said speech whether each of said received speech sounds is a consonant sound or a vowel sound and for producing a speech cuing symbol signal when sequentially received speech signals define a consonant sound and a vowel sound, respectively, and which together form a syllable, each speech cuing symbol signal representing one of a plurality of groups of consonant sounds, the sounds in each of the groups of consonants sounds being differentiatable one from the other by viewing the lips of the speaker and one of a plurality of groups of vowel sounds the sounds in each of the groups of vowel sounds being differentiatable one from the other by viewing the lips of the speaker, said groups of consonant sounds substantially corresponding to groups of consonant sounds used in manually cued speech, said groups of vowel sounds substantially corresponding to groups of vowel sounds used in manually cued speech; and means for producing an image of one of a plurality of cuing symbols in response to said speech cuing symbol signal, said cuing symbol identifying the group of consonant sounds to which said syllable belongs; and means for displaying said image of said cuing symbol in said field of view in a color identifying the group of vowel sounds to which said syllable belongs.

13. An apparatus as in claim 12, wherein said circuit means includes means for producing in response to detection of a consonant sound, a first signal indicating one of said plurality of consonant sound groups, the detected consonant sound being a consonant sound in that group and, in response to detection of a vowel, a second signal indicating one of said plurality of vowel sound groups, the detected vowel sound being a vowel sound in that group, and means for producing said speech cuing symbol signal when said first signal in combination with said second signal represent a syllable.

14. A method of providing cues to a hearing impaired or deaf person to aid in resolving ambiguities from lip reading another person comprising the steps of:

detecting a sequence of speech sounds of a speaker, and producing an electrical speech signal for each said detected sound;

determining from said speech signals whether each of said speech sounds is a consonant sound or a vowel sound and producing a speech cuing symbol signal when sequentially received speech signals define a consonant sound and a vowel sound, respectively, and which together form a syllable each speech cuing symbol signal representing one of a plurality of groups of consonant sounds, the sounds in each of the groups of consonants sounds being differentiatable one from the other by viewing the lips of the speaker, and one of a plurality of groups of vowel sounds the sounds in each of the groups of vowel sounds being differentiatable one from the other by viewing the lips of the speaker, said groups of consonant sounds substantially corresponding to groups of consonant sounds used in manually cued speech, said groups of vowel sounds substantially corresponding to groups of vowel sounds used in manually cued speech; and displaying a speech cuing symbol for each said speech cuing symbol signal into the field of vision of a person so that the speech cuing symbol displayed identifies the group of consonant sounds to which said syllable belongs and the speech cuing symbol is displayed in a location identifying the group of vowel sounds to which said syllable belongs.

15. A method as in claim 14, wherein said step of producing a speech symbol signal includes producing, in response to detection of a consonant sound, a first signal indicating one of said plurality of a consonant sound groups, the detected consonant sound being a consonant sound in that group, and in response to detection of a vowel, a second signal indicating one of said plurality of vowel sound groups, the detected vowel sound being a vowel sound in that group and producing a speech symbol signal when said first signal in combination with said second signal represent a consonant.

* * * * *